US005936022A

United States Patent [19]
Freeman

[11] Patent Number: 5,936,022
[45] Date of Patent: Aug. 10, 1999

[54] COMPOSITIONS AND METHODS FOR A HIGH PERFORMANCE PROTECTIVE COATING

[75] Inventor: John E. Freeman, Big Spring, Tex.

[73] Assignee: Freecom, Inc., Big Spring, Tex.

[21] Appl. No.: 08/920,580

[22] Filed: Aug. 29, 1997

[51] Int. Cl.$^6$ ..................................................... C08K 3/00
[52] U.S. Cl. ........................... 524/442; 524/444; 524/445; 524/492; 524/493
[58] Field of Search ..................................... 524/492, 493, 524/442, 444, 445

[56] References Cited

U.S. PATENT DOCUMENTS

| | | | |
|---|---|---|---|
| 4,789,567 | 12/1988 | Freeman et al. | 427/410 |
| 4,968,538 | 11/1990 | Freeman | 427/410 |
| 5,508,373 | 4/1996 | Shah et al. | 528/210 |

FOREIGN PATENT DOCUMENTS

| | | |
|---|---|---|
| 2639365 | 2/1994 | France . |
| 2225323 | 5/1990 | United Kingdom . |

OTHER PUBLICATIONS

Freecom News Newletter, vol. 5 Issue 1, Mar. 1997.
Freecom, Inc. Brochure; "CeRam–Kote 54, The Flexible Ceramic", Feb. 10, 1997.
Freecom, Inc. Technical Data Booklet; "CeRam–Kote 54, The Flexible Ceramic", Jan. 10, 1997.
Freecom News Newsletter, vol. 3 Issue 5, Jun./Jul. 1995.
Zeelan Industries, Inc. Brochure; "Zeeospheres", 1993.
Freecom, Inc. Product Information Booklet; "CeRam–Kote 54", Dec. 1991.
W. R. Grace & Co. Material Safety Data Sheet: "Syloid 74/Syloid 74FP"; Mar. 29, 1985.
Cabot Corporation Technical Data Sheet: "Cab–O–Sil"; Aug. 1983.

*Primary Examiner*—Edward J. Cain
*Attorney, Agent, or Firm*—Matthews, Joseph, Shaddox & Mason, P.L.L.C.

[57] ABSTRACT

A high performance protecting surface coating, and methods, is disclosed. The coating comprises a resin such as epoxy loaded with inert particles, preferably ceramic, a curing agent for hardening, and a selected additive such as a solvent. The protective coating of the present invention has adhesion strength of at least 2,000 psi and impact resistance of at least 90 inch-lbs.

42 Claims, No Drawings

COMPOSITIONS AND METHODS FOR A HIGH PERFORMANCE PROTECTIVE COATING

FIELD OF THE INVENTION

This invention relates generally to protective coatings and paints. More particularly this invention pertains to a coating system providing a tough wear and corrosion resistant material having extremely high adhesion to various metal, concrete, composite, or plastic substrates.

BACKGROUND OF THE INVENTION

Protective coatings are often used on many mechanical or protective surfaces to prevent corrosion, abrasion, and other wear on the surface. High performance coatings have been developed which exhibit high resistance to abrasion, corrosion, impact, and other characteristics of high performance. These coatings include powder comprising finally divided inert particles dispersed in a resin which is then mixed with a hardening catalyst and applied.

The resin of the present coating should be selected for its wear resistant properties and by the strength of its adhesion to the surface being protected. Some commonly used resins include epoxy (e.g., Bisphenol A and Bisphenol F based epoxies), polyester, vinyl-ester, phenolic, novolac (phenol/novolac), and polyglycol resin. Epoxy resins are known to those skilled in the art to have the highest adhesion values of all resins.

The adhesion strength of coatings is measured according to an international industry standard referred to as American Standard Testing Materials (ASTM). ASTM adhesion testing involves applying and curing a coating on to a surface substrate prepared according to National Association of Corrosion Engineers (NACE) specifications. For example, a steel test panel prepared to an anchor profile of 1 to 2½ mils (white to near white metal) and cleaned of substantially all contaminates. The coating is applied and cured at room temperature (72° F.). Adhesion is tested according to ASTM protocol by pulling off the cured coating and measuring the force required to pull the coating of the surface. Adhesion is measured under ASTM protocol in metric units known as Megapascals (Mpa). For convenience, Mpas are often converted herein to approximate English units of pounds per square inch (psi).

In addition, or alternatively to ASTM testing, adhesion may also be measured by resistance to hydroblasting, i.e., measuring the force (in psi) of a pressurized stream of water to dislodge a coating from a standard prepared surface. Typically, adhesion strengths are the same whether measured by ASTM pulling or hydroblasting. One drawback of ASTM testing is that the surface substrate may fail by mechanical breakage or some other means before the coating being tested fails.

Epoxy resins are known to those skilled in the art to have the highest adhesion strength of commonly available resins, epoxy having adhesion strength measured in the range of approximately 800 to 1,200 psi.

Phenol/novolac resins are thermoset plastic materials offering alternatives to Bisphenol A-based epoxies and Phenolic resins, particularly when formulators and fabricators seek good strength and good chemical resistance at high temperatures. Phenol/novolac epoxy combines in one molecule the stability of a phenolic backbone with the reactivity and versatility of an epoxy resin. The resulting resins have multi-epoxy functionality. The additional reactive sites, as compared to a Bisphenol A-type resin, produce tightly cross-linked cured systems with improved resistance to acids, bases, and solvents; retention of good mechanical properties at high temperatures; minimal shrinkage for accurate reproduction; acceptance of a wide range of modifiers, fillers, and pigments; and improved high temperature adhesive properties. The phenol/novolac resin is usually received from the manufacturer dissolved in 15% acetone by weight of phenol/novolac.

The resin carrying the inert particles must be mixed with an appropriate hardening catalyst or curing agent to form a base composition before application. Generally both the resin and catalyst are supplied from the coating manufacturer with instructions as to mixing. A coating commercially available is manufactured by Owens-Corning and marketed under the name Owens-Corning Abrasion Resistant Coating (ARC). The Owens-Corning coating contains finally divided ceramic particles dispersed in an epoxy resin, and a compound that adds flexibility to the coating.

Another coating commercially available is manufactured by Freecom, Inc. under the name "Ceram-Kote 54." The Freecom product is sold with instructions that allow the user to dilute or thin the resin and catalyst mixture with an appropriate solvent to provide for ease of application and for various desired surface finishing and coating qualities.

To the base composition mixture various additives may be combined to greatly enhance the qualities of the final product. Such additives may include pigments for color and thixatropes to inhibit running and sagging, a variety of inert ceramic powers added to enhance the abrasion resistant capabilities of the coating, and selected solvents to dilute the coating for enhanced uniformity of coverage of the surface being coated. The solvent or solvents should be selected on the basis of their lack of reactivity with any other components of the coating, particularly the base composition and any other additives. Isopropyl alcohol (isopropanol) and methyl-ethyl-ketone (MEK) have shown to be very good solvents in the present invention.

U.S. Pat. No. 4,789,567, issued Dec. 6, 1988, to Freeman, hereinafter referred to as the '567 patent, and which is incorporated herein by reference, discloses a protective coating of finely divided abrasions resistant inerts carried in a corrosion resistant epoxy resin that is diluted with a solvent and applied to a surface. The coatings of the '567 patent may be cured to achieve either a glossy or a mat finish. The '567 patent, however, does not disclose nor teach the performance characteristics of the coating of the present invention. Nor does the '567 patent teach the use of additives in the manufacture of the coating to achieve desired performance characteristics.

U.S. Pat. No. 4,968,538, issued Nov. 6, 1990, to Freemen, a continuation-in-part of the '567 patent, hereinafter referred to as the '538 patent, and which is incorporated herein by reference, discloses a protective coating of finely divided abrasion resistant inerts in a corrosion resistant epoxy resin diluted with a solvent, and further disclosed the addition of novolac resin dissolved in methyl-ethyl-ketone (MEK) and polyglycol di-epoxide resin to the epoxy resin carrying inert particles. The '538 patent, however, the '567 patent, however, does not disclose nor teach the performance characteristics of the coating of the present invention. Nor does the '567 patent teach the use of additives in the manufacturer of the coating to achieve desired performance characteristics.

SUMMARY OF THE INVENTION

The coatings of the present invention comprise: a high performance surface coating, said coating comprising: at least one resin; inert particles loaded into said resin to form a mixture of resin and inert particles; a catalyst, wherein said mixture and said catalyst combine to form a base composition; and at least one additive added to said base composition to form a final coating composition having desired performance characteristics, and wherein said performance characteristics comprise adhesion strength of at least approximately 2,000 psi and impact resistance of at least 90-inch/lbs.

The present invention also comprises a method of applying a high performance surface coating to a surface, said coating comprising: at least one resin; inert particles loaded into said resin to form a mixture of resin and inert particles; a catalyst, wherein said mixture and said catalyst combine to form a base composition; and at least one additive added to said base composition to form a final coating composition having desired performance characteristics, and wherein said performance characteristics comprise: adhesion strength of at least approximately 2,000 psi and impact resistance of at least 90-inch/lbs, the method comprising: preparing the surface to be coated to achieve an appropriate anchor profile, re-suspending all said inert particles loaded in said resin, applying said additive and base composition mixture to said surface, and curing said coating to achieve a desired finish.

The present invention further comprises a method of manufacturing a high performance surface coating, the method comprising: providing at least one resin, loading inert particles into said resin to form a mixture of resin and inert particles, adding a catalyst to mixture, wherein said mixture and said catalyst combine to form a base composition; and adding at least one additive to said base composition to form a final coating composition having desired performance characteristics of said coating, and wherein said performance characteristics comprise adhesion strength of at least approximately 2,000 psi and impact resistance of at least 90-inch/lbs.

The coatings of the present invention are very high performance, having extremely high adhesion to carbon steel, stainless steel, aluminum, titanium, fiberglass, composite materials, plastics, and concrete, and having very high resistance to abrasion and corrosion. The coatings of the present invention are thin film and may be applied simply with a spray gun, brush, or roller, or by dipping the item to be coated into the coating of the present invention. The coatings of the present invention are flexible, machinable (when cured) and tolerate temperatures up to 300° F. (149° C.) with no deterioration of performance.

The coatings of the present invention comprise an inert particle loaded resin and a catalyst combined to form a base composition, together with any additives added to said base composition to achieve a final composition having desired performance characteristics.

To load the resin with inert particles such as ceramic, the selected resin should be of such viscosity that the resin may be stirred or mixed with sufficient vigor to incorporate the solids. Usually this is accomplished by warming the resin. The temperature of the resin for mixing in the inert solids depends on the resin selected. For example, a good working temperature range for epoxy resin is in the range of approximately 100° F. to 120° F. Resins that start out more viscous than epoxy may require higher temperatures. The resin should not be warmed to such temperatures, however, as to effect the coating properties of the resin. The resin is stirred or mixed and the inert solids are added to the resin gradually and combined with the resin by the mixing action. The inert solid particles are added to the resin until the mixture is in the range of approximately 60% to 90% solids by weight of the mixture.

The coatings of the present invention are provided in two parts: the base, Part A, which is the inerts loaded resin composition, and a curing agent or catalyst, Part B. The base (Part A) is in two phases: one is solids (resin and inerts), the other phase is a small liquid layer on top. The base is mechanically shaken until all solids are in suspension, before the catalyst (Part B) is added. Shaking is renewed after catalyst addition until the batch is completely mixed. The standard ratio by volume is 13 measures of the base and one measure of the catalyst. Should thinning be required to decrease the viscosity for spraying, isopropyl alcohol or methyl-ethyl-ketone (MEK) may be used sparingly.

In some instances, proper preparation of the surface may be useful to achieve maximum performance of the coatings of the present invention. For example, it is recommended that steel surfaces to which the coating is to be applied be prepared to white or near white metal (SSP-10 or NACE-2) with a blast ink or pattern profile of 1 mil to 2½ mils maximum. 1 mil=25 angstroms. Aluminum requires only a light blasting or an alodine wash before coating. Polyester, epoxy and other plastics should be wiped with solvent and slightly roughen for better adherence. For best results, substrates must be clean and clear of contaminants.

The coatings of the present invention may be applied by brush, roller, standard air spray or airless spray equipment or by dipping the item to be coated into the coating of the present invention. Curing by air at room temperature occurs within six to eight hours for a standard finish. Curing may occur more rapidly or for different finishes by exposing the coating to elevated temperatures for varying periods of time.

DETAILED DESCRIPTION OF THE PREFERRED EMBODIMENT

In the preferred embodiment of the present invention, a loaded resin is prepared by loading a wear resistant resin with particles of inert solids to form a mixture of inert particles suspended in resin. The inert particles may be in the form of irregularly shaped granules, spheres or platelets, depending upon the method of manufacturer, and may range in size from a few angstroms to several microns in size. Ceramic is the preferred inert, but any other abrasion resistant inert compound may be used.

To load the resin with inert particles, the resin is stirred and inert solid particles are added gradually. The resin may need to be warmed first to achieve an adequate mixing viscosity. The temperature to which the resin is warmed will vary depending on the resin selected. For epoxy resin, for example, the epoxy is typically warmed to within approximately 100° F. to 120° F. In the preferred embodiment, the resin is mixed with a high speed disperser. The disperser usually comprises a shaft with a mixing blade at the mixing end of the shaft, wherein the blade comprises sharp points to facilitate shearing of the mixtures, which results in more efficient dispersal of the components throughout the mixture. Particles are added to the resin until the mixture is in the range of approximately 60% to 90% inert solid particles by weight of the mixture. In the preferred embodiment, the range is approximately 75% to 90% solids by weight. For purposes of the present invention, however, the precise ratio of resin to solids is less critical than the performance characteristics of the final coating composition.

An appropriate catalyst such as diethylene triamine or cycloaliphatic amine solvent is added to the loaded resin to form a base composition and to initiate the curing process. The base composition is diluted with selected solvent additive such as isopropyl alcohol, methyl-ethyl-ketone (MEK), or both. Other additives such as inert particles, thixatropes (such as silica-hydrophilic or hydrophobic), and pigments, for example, may be added to the base composition to form a final coating composition having desired performance characteristics. The performance characteristics of the preferred embodiment comprise adhesion strength of at least 2,000 psi.

The high performance coating of the present invention has a surprisingly high adhesion strength, as measured by ASTM or hydroblasting, of at least 2,000 psi. This is stronger adhesion than is measured for ordinary epoxy.

The adhesion strength of the coatings of the present invention come from the high solids content of the coating. The high solids content, or "ceramic particle loading," produces low shrinkage during curing and results in lower stress levels in the cured coatings. Less shrinkage and lower stress yields a longer-lasting coating. Another factor that contributes to the bonding strength of the coatings of the present invention is that during curing, no by-products are formed, thus volatile agents are not generated to act as plasticizers.

The present invention comprises a higher inerts content in a resin than is achieved by those of ordinary skill in the art. The inert particles may be loaded into the resin of the present invention by any of a variety of mechanical means, including but not limited to, mixing, stirring, blending, folding, and the like. In the present invention, inert particles are loaded into the resin to form a resin/inert particle mixture comprising finely divided inert particles in suspension in a resin, wherein the inert particles comprise at least approximately 60% of the weight of the mixture. In the preferred embodiment, the inert particles comprise from approximately 75% to approximately 90% of the weight of the mixture, wherein the mixture is comprised almost entirely of inert particles and just enough resin to coat each such particle with a thin film of resin.

The higher the content of inert particles in the present invention, the greater the wear resistance and overall toughness of the final coating composition. Ordinarily, the ease of application of the present coating may diminish with increased content of inerts. However, the present invention may be diluted with an amount of an appropriate solvent additive to improve the ease of application of the present invention comprising a high content of inert particles in the range of 80% to 90% of the weight of the is resin/particle mixture.

The finish of the coating of the present invention may be customized to the needs or desires of the user by vary the curing process of the present coating as described below. Curing the final coating composition slowly allows the inert particles to settle down, away from the surface of the coating, leaving a smooth outer surface of the coating, resulting in a glossy finish of the coating. More rapid curing causes the coating of the present invention to set-up before the inerts therein can settle significantly. The outer surface of the coating, therefore, is less smooth with rapid curing, resulting in a flat or mat finish of the present coating.

While other coatings offer resistance to specific classes of chemicals, the coatings of the present invention resist caustics as well as most acids, petroleum distillates and solvents. The coatings of the present invention also provide excellent electrical insulating characteristics (di-electric and resistive properties), and retain these properties under severe operating conditions. The coatings of the present invention are Volatile Organic Content (VOC) compliant. The established VOC rating of the coatings is approximately 1.63 lbs/gal (196 g/l), which is well below the projected maximum VOC content for Industrial Maintenance Coatings expected to be promulgated by the U.S. Environmental Protection Agency. In addition, the coatings for the present invention are manufactured with epoxies and inert ceramic powders that are food grade when cured.

The present coating comprises at least one resin, such as epoxy. Another embodiment of the present coating further comprises novolac resin dissolved in 15% MEK by weight of novolac and added in the range of from 3.5% to 10% by weight of said base composition, polyglycol di-epoxide resin added in the range of from 0.7% to 2.7% by weight of said base composition, and silicon dioxide added in the range of from 4% to 20% based on the weight of the base composition.

Prior to application of the coating to a surface, it may be helpful to prepare the surface. For optimal performance, steel surfaces must be prepared to white (NACE-1/SSPC-5) or near white (NACE-2/SSPC-10) finish by abrasive air blast cleaning or the like to achieve an anchor profile of 1 mil to 2½ mils maximum. Aluminum requires only a light blasting or an alanine wash before coating. Polyester, epoxy, and other plastics and composites should be wiped with solvent and slightly roughened for better adherence. For best results the substrates must be clean and free of contaminates.

The coatings of the present invention require mixing before use. The base, Part A, is all solids (resin and inert particles) suspended in a small amount of solvent, and the solids settle during storage. The solids must be brought back into full suspension by vigorous mechanical shaking with a paint shaker for approximately five to ten minutes prior to adding catalyst. After adding catalyst into the base to form a base composition, shaking is continued for another five to ten minutes to complete the mixing. The length of time required for shaking or mixing depends on the ambient temperature. Higher temperatures require less shaking time and colder temperatures require longer shaking time. All inert solids must be in suspension prior to adding the catalyst (Part B). Mechanical mixing or shaking means may also be used to combine the catalyst with the loaded resin to form the base composition. After shaking or mixing the coatings of the present invention, it is recommended to strain the coating into a standard paint strainer and pour it into spray equipment or some other appropriate container. The pot life of the catalyzed coating at 72° F. is approximately 4 to 6 hours.

The viscosity of the base composition catalyst mixture is adjusted with small amounts of an additive comprising a selected solvent such as isopropanol (99% pure) or methyl-ethyl-ketone (MEK). Using a number 4 for viscosity cup, viscosity should be 34 to 38 seconds at 75° F. to 80° F. (23° C. to 26° C.). The particular solvent used to dilute the coating may vary with the resin which carries the inert particles. The solvent selected should be mutually soluble with the base composition. The selected solvent should also flash readily. Where flexibility of the coating is a concern, and particularly where elastomers to enhance flexibility are included in the final coating composition, hospital grade Isopropyl alcohol (99% by volume alcohol) is the preferred solvent. Where flexibility is less of a concern, MEK is a suitable solvent, although both Isopropyl alcohol and MEK are generally satisfactory solvents for most uses. Another useful solvent for the present invention is HECTROLAX®, manufactured by Ashland Chemical Company. In addition to being a useful solvent, HECTROLAX® also contains mica (a natural form of silica), which provides protection of the substrate from ultra-violet radiation.

For best results, the coatings of the present invention should be applied by spraying. High volume, low pressure equipment is recommended as are tungston carbide needles and fluid nozzles for maximum life and to prevent damage to spray equipment. The compressed air source of the spray equipment should be outfitted with dryers as needed to supply moisture free air. Dry nitrogen may also be used as a pressure source. Airless equipment may also be used.

The coatings of the present invention spray like automotive enamel paints. Apply a light first pass of 3 to 4 mils and allow the coating to sit until tacky. Normally 30 to 40 minutes is sufficient, but allow more time if the temperature is below 70° F. Apply a second pass of 3 to 4 mils for a total dry film thickness (DFT) of 6 to 8 mils. Apply additional mils without occurring runs or sags if the finish product requires thicker coverage. Whenever impossible, always apply the second coat in a cross-coat method to the first coat.

The finished application of the material appears glossy when wet. It gels at room temperature (72° F.) in approximately 3 hours. Longer gel times occur at colder temperatures and shorter gel times occur at higher than room temperature. An 80% cure is achieved within 12 hours, and full cure is achieved within 48 hours at room temperature. Elevated temperatures produce full cures in shorter times. It is possible to place material into service after 12 hours at room temperature or earlier if the temperature is above 72° F. Room temperature curing typically yields a glossy appearance to the finish of the coating by allowing the inert particles to settle away from the surface of the coating.

Should a more rapid cure be desired, the coatings of the present invention cures in 1 hour if the temperature is elevated to 150° F. If this method is used, the finish appears flat (mat) to semi-gloss depending on the amount of time the coating air dried prior to rapid curing; by causing the coating to setup or gel before the inert particles settle away from the surface of the coating. Some flexibility, however, is lost by rapid curing.

Should a glossy finish be desired with rapid curing, spray and air dry the coating for 15 to 30 minutes. Then, place the coated part in an oven at a temperature at approximately 110° F. to 120° F. However, some loss of gloss and flexibility can be expected. If allowed to air cure prior to heating, the product maintains its glossy finish.

The coatings of the present invention, when applied and cured as described above, achieve the characteristics detailed in Table I.

TABLE I

| | |
|---|---|
| Adhesion (ASTM 4541, elcometer pull-off) | >2,000 psi (15.17 Mpa) The failure made was a fracturing through the glue |
| Adhesion (ISO 4624, using hydraulic test equipment type P.A.T. Model GM01) | >4,000 psi (27.98 Mpa) |
| Abrasion Resistance (ASTM D 4060, Tabor Test 1,000 cycles, CS 17 wheel, 1 kg) | 10.9 Miligrams loss |
| Flexibility (ASTM D 522, Conical Mandrel Bend at 75° F.) | >30% elongation |
| Impact Resistance (ASTM G 14) | 30 inch-pounds Impact Strength |

TABLE I-continued

| | |
|---|---|
| Static Coefficient of Friction (ASTM D 4518-90) | 0.152 mean static friction value |
| Dielectric Strength (ASTM D 149) | 1,435 volts/mil |
| Spray Salt (Fog), 5% solution, >1500 hours (ASTM B 117) | No distress observed |
| Continuous-Use Temperature | 300° F. (149° C.) |
| Fire Rating over Steel (ASTM E84-91a) | Smoke Density-Class 1 Flame Spread-Class 1 |
| VOC (Volatile Organic Compounds) | 1.63 lb/gal (196 g/lit) |

The adhesion strength of the coating of the present invention is measured to be at least 2,000 psi, which is stronger than one would expect from epoxy alone. The upper limit of the adhesion strength of the present coating is not known although it has been measured as high as 5,000 psi.

The performance characteristics summarized in Table I are illustrated in the following examples of performance testing:

EXAMPLE 1

Adhesion Testing

Test #1 a. Procedure: Measurements were made in compliance with ISO 4624. Adhesion was controlled using hydraulic test equipment, types P.A.T. Model GM01 connected to a data logger. Scotch Weld 3M DP460 adhesive was used, thermally cured at 50° C. for 10 hours prior to testing.

b. Prepared by: Hydro Research Centre
   Porsgrunn, Norway
   Thor H. Jahnsen c. Date: Sep. 18, 1994 d. Test Panels: Carbon steel test plate coated with the present invention, test area 1.57 cm$^2$ e. Results: Test 1 27.62 Mpa
   Test 2 25.58 Mpa
   Test 3 27.67 Mpa
   Test 4 27.98 Mpa (>4,000 psi)
   Standard deviation 1.10
   Average 27.21 Mpa Adhesion of the Present Invention on Other Metals and Varying Surface Preparations:

Test #1A Adhesion of the present invention on Titanium Plate
   Prepared by: Norcoat A. S.
   Date: Sep. 20, 1994
   Titanium plate: 25 Mpa (3,625 psi)

Test #2A Adhesion of the present invention on Stainless Steel
   Prepared by: Ceram-Coat Scandinavia AS
   Date: Jan. 1, 1995
   Stainless steel: 24.94 Mpa (3,616 psi)

Test #3A Adhesion of the present invention on Aluminum
   Prepared by: Cream-Coat Scandinavia AS
   Date: Jan. 1, 1995
   Aluminum: 26.18 Mpa (3,796 psi)

Test #4A Prepared by: Norsk Hydro Research Centre
   Date: Mar. 15, 1996
   1) Surface Preparation:(UHPW)Ultra High Pressure Water 125 mm pipe, Grade HB2 29.49 Mpa (4,277 psi)

2) Surface Preparation: (UHPW) and Blast Cleaning to SA-2½ 125 mm pipe, 34.44 Mpa (4,994 psi)

Test #2
 a. Procedure: ASTM D4541 Adhesion Elcometer Pull-off
 b. Prepared by: Technical Inspections Services, Inc.
   Houston, Tex.
   Paul E. Partridge
 c. Date: May 8, 1995
 d. Test Panels: Steel test panels with a blast profile of 2.5 mils coated with 4 to 10 mils of the present invention using conventional spray equipment
 e. Results: Adhesive strength greater than 2,220 psi.
   On all three pulls, the primary failure mode was a fracturing of the glue.

EXAMPLE 2

Abrasion/Tabor Test
 a. Procedure: ASTM D4060, Tabor abraser using a load of 1,000 grams on CS 17 wheels
 b. Prepared by: Technical Inspection Services, Inc.
   Houston, Tex.
   Paul E. Partridge
 c. Date: May 8, 1995
 d. Test Panels: Steel test panel with a blast profile of 25 mils coated with 4 to 10 mils of the present invention using a conventional spray equipment.
 e. Results: Average mass loss after 1,000 cycles 10.9 mg/0.0109 g
   Average mass loss after 5,000 cycles 64.7 mg/0.0647 g

EXAMPLE 3

Flexibility/Mandrel Bend
 a. Procedure: ASTM D522, Air-dry specimens applied to 0.032" thick plates were bent over a conical mandrel.
 b. Prepared by: Technical Inspection Services, Inc.
   Houston, Tex.
   Paul E. Partridge
 c. Date: May 8, 1995
 d. Test Panels: Steel test panels with a blast profile of 2.5 mils coated with 4 to 10 mils of the present invention using a conventional spray equipment.
 e. Results: No visible cracking observed at ⅛" diameter. Percent elongation greater than 30%.

EXAMPLE 4

Static Coefficient of Friction
 a. Procedure: ASTM D4518-90
   Method A: Inclined Plane Test
   Method E: Horizontal Pull Test
 b. Prepared by: Technical Inspection Services, Inc.
   Houston, Tex.
   Paul E. Partridge
 C. Date: May 4, 1995
 d. Test Panels: Steel test panels with a blast profile of 2.5 mils coated with 4 to 10 mils of the present invention using a conventional spray equipment.
 e. Results: Polished stainless steel facing
   Method A—Mean static friction value 0.152
   Method B—Mean static friction value 0.133

EXAMPLE 5

Differential Flow Characteristics of the Present Invention Internally Coated Pipe
 a. Procedure: This test determines the fluid friction coefficient for pipe internally coated with the present invention. To calculate the friction factor coefficients for each piece, a standard pressure head loss test was carried out using water flow over an appropriate range of Reynolds numbers in the turbulent range.
 b. Prepared by: National Engineering Laboratory
   East Kilbride, UK
 c. Date: September 1995
 d. Test Panels: Two (2) pieces of 2⅜", 4.6 lb/ft tubing. One piece was internally coated with the present invention and the other was internally shot blasted clean.
 e. Results:

| Flow Rate Liters/Sec [gal/min] | Friction Factor Coefficient "Shot Blast Test Piece" | Friction Factor Coefficient Present Invention Test Piece | Present Invention Percentage Improvement on Friction Factor |
|---|---|---|---|
| 750 [47.31] | 0.0233 | 0.0201 | 15.9% |
| 2750 [173.47] | 0.0218 | 0.0158 | 38.0% |
| 3800 [239.70] | 0.0236 | 0.0149 | 58.4% |
| 4450 [280.71] | 0.0243 | 0.0145 | 67.6% |

Surface Roughness Measurement:
Shot Blast Cleaned Test Piece Ra=7 micro meters [300 micro inches]
Present Invention Test Piece Ra=0.4 micro meters [16 micro inches]

EXAMPLE 6

Cathodic Disbonding
 a. Procedure: ASTM G8/G42
   Duration: 30 days
   Temperature: 23° C. and 70° C.
   Electrical Current: −1.5 V
 b. Prepared by: Raychem Ultratec Division
   Kessel-Lo, Belgium
 c. Date: Sep. 19, 1995
 d. Test Panels: Segments of 2" pipe coated with the present invention
 e. Results: In combination with cathodic protection systems, the coating performs well at ambient temperatures.

| Coating | Thickness (Um) | Temperature (° C.) | Increase in disbonding radius (mm) |
|---|---|---|---|
| Present Invention | 425 | 23 | 8 mm, OK |
| Present Invention | 360 | 70 | blisters |

EXAMPLE 7

Autoclave Testing of Several Samples of the Present Invention: Hydrostatic Seawater Test, Report #05-1648-2
 a. Procedure: Temperature: 90° C./194° F.
   Pressure: 5,000 psi
   Liquid Phase 1
   Aqueous: Synthetic Seawater
   Liquid Phase
   Hydrocarbon: None
   Gas Phase: None
   Duration: 24 Hours
   Release Temp: Less than 65° C./150° F.

Release Time: 30 minutes
b. Prepared by: Technical Inspection Services, Inc. Houston, Tex.
c. Date: Jul. 12, 1995
d. Test Panels: Twenty-two (22) coupons measuring about 1.5"×3" were cut from the larger samples using a bandsaw. The coupons were coated with the present invention at Big Spring, Tex. and TISI. The samples designed with a "PC" suffix were post-cured at 140° F. for two (2) hours, room temperature for one (1) hour and then 300° F. for one (1) hour. The samples were tested for performance in a one-phase hydrostatic autoclave test.
e. Results:
Sample #5 2⅜" O.D. Gray OD, Med. Gray I.D. No Blisters O.D.: No Blisters
Sample #5PC 2⅜" O.D. Gray OD, Med. Gray I.D. No Blisters O.D.: No Blisters
Sample #6 2⅜" O.D. Gray-Brown I.D., Bare O.D. #3: Not Tested
Sample #7 2⅜" O.D. Gray-Brown I.D., Bare O.D. #4: No Blisters
Sample #7PC 2⅜" O.D. Gray-Brown I.D., Bare O.D. #4: No Blisters
Sample #8 Q-Panel 1/32"×3"×5": Coated at Big Spring: No Blisters
Sample 8PC Q-Panel 1/32"×3"×5": Coated at Big Spring: No Blisters
Sample 9 Q-Panel coated at TISI, 10 mils: No Blisters
Sample 9PC Q-Panel coated at TISI, 10 mils: No Blisters
*Experimental coupons #1 through #4 not reported.

EXAMPLE 8
Corrosion, Chemical Test
a. Procedure: Testing was completed in accordance with ANSI 124.1 on fully cured samples with various exposed regions.
  1. Immersion Test . . . Liquids at room temperature for:
    ■ 1-A=16 hours
    ■ 1-B=24 hours
    ■ 1-C=168 hours
  2. Immersion test . . . Boiling liquid for 24 hours.
  3. Rub test . . . 100 cycles with a saturated cloth.
b. Prepared by: Owens-Corning Fiberglass Corp.
   Technical Center
   Granville, Ohio
c. Date: September 1985
d. Results:

|  | Chemical | Method | Effect |
|---|---|---|---|
| Acids | Hydrochloric Acid 10% | 1B, 1C | None to Slight |
|  | Acetic Acid 10% | 1B, 1C | Slight |
|  | Sulfuric Acid | 1B, 1C | None to Slight |
|  | Nitric Acid 10% | 1B, 1C | Moderate |
| Bases | Ammonium Hydroxide 20% | 1B, 1C | No Effect |
|  | Sodium Hydroxide 50% | 1B, 1C | No Effect |
|  | Sodium Hydroxide 30% | 2 | No Effect |
| Detergents and Bleaches | Spray & Wash | 1A | None |
|  | Wisk | 1A | None |
|  | Clorox | 1A | Slight |
| Solvents | Acetone | 1A | None to Slight |
|  | Methanol | 1A | None to Slight |
|  | Ethanol | 1A | None to Slight |
|  | Methyl-Ethyl-Ketone | 1B, 1C | None to Slight |
|  | Stoddard Solvent | 3 | No Effect |

-continued

|  | Chemical | Method | Effect |
|---|---|---|---|
|  | Toluene | 3 | No Effect |
|  | Gasoline | 3 | No Effect |
| Other | Hydraulic Fluid (Skydrol) | 1C | None |

NOTE: Slight=Discoloration; Moderate Chalking; Severe=Blistering

EXAMPLE 9
Dielectric Strength Test
a. Procedure: ASTM D149 dielectric strength in air or oil
b. Prepared by: Owens-Corning Fiberglass Corp.
   Granville, Ohio
   George W. Ritter, Ph.D.
c. Date: Aug. 21, 1986
d. Test Panels: Steel test panels coated with the present invention at a dry film thickness of 4 mils
e. Results: In Air=Approximately 7,000 volts at 7 mil
In Oil=Approximately 10,000 volts at 7 mil

EXAMPLE 10
Impact Test
a. Procedure: ASTM D2794—Intrusion Direct Impact
b. Prepared by: Technical Inspection Services, Inc.
   Houston, Tex.
   Paul E. Partridge
c. Date: May 8, 1995
d. Test Panels: Steel test panels with a blast profile of 2.5 mils coated with 4 to 10 mils of the present invention using a conventional spray equipment.
e. Results: Impact resistance . . . 90 inch-pounds

EXAMPLE 11
Humidity Test
a. Procedure: Specimens were exposed to 100% condensing humidity at 140° F./60° C. for two weeks (336 hours)
b. Prepared by: Boeing Materials Technology
   Renton, Wash.
c. Test Panels: Two (2) stainless (301) window clips coated with white gloss present invention
d. Results: No loss of coating adhesion, blistering or other visible defects were observed on the window clips.

EXAMPLE 12
Salt Fog Chamber Test (336)
Test #1
a. Procedure: Specimens were exposed to a 5% salt spray solution at 95° F./35° C. for two (2) weeks (336 hours).
b. Prepared by: Boeing Materials Technology
   Renton, Wash.
C. Date: Nov. 30, 1988
d. Test Panels: Stainless steel (301) coupons coated with white gloss present invention
e. Results: The stainless steel revealed no signs of coating deterioration.
Test #2
a. Procedure: ASTM B117, 5% salt spray solution
b. Prepared by: Southwestern Laboratories
   Ft. Worth, Tex.

Kemp E. Akeman, P.E.

c. Date: May 23, 1994 d. Test Panels: 3"×6" steel panels coated with the present invention e. Results: After 1,667 hours of exposure, no distress of coated body was observed. Test was terminated at 1,667 hours.

EXAMPLE 13
Surface Burning Characteristics of the Present Invention Applied to 16 Gauge Sand Blasted Carbon Steel a. Procedure: ASTM E84-91a b. Prepared by: Southwest Research Institute
San Antonio, Tex.

c. Date: Jul. 6, 1995 d. Test Panels: Ceramic/epoxy coating (present invention) was applied with a conventional spray gun to ten (10) sections of 24'×24' square 16 gauge carbon steel, which was blasted to a NACE I (SSPC=SP5, Swedish=SA-3) white metal finish. Two passes at 30 minutes apart for a total D.F.T. of 7–10 mils. (Sample was prepared by the client).

e. Results: Flame Spread Index: 20 (Class I Fire Rating)
Smoke Developed Index: 40 (Class I Fire Rating

EXAMPLE 14
Fire Resistant Hydraulic Fluid (Skydrol) Special Test (BMS 3-11)

a. Procedure: One half of aluminum sample coated with the present invention immersed in BSM 3-11 (Skydrol Hydraulic Fluid) for 13 days.

b. Prepared by: Boeing Materials Technology
Renton, Wash.
Sisty Cortner, Material Engineer c. Date: Nov. 30, 1988 d. Test Panels: Aluminum 2024-T3 e. Results: One half of each specimen was immersed in BSM 3-11 for 13 days. Pencil hardness tests were then prepared per BSS 7263 to determine of coating had softened. Coating was examined for blistering, loss of adhesion or other deterioration. There was no noticeable softening of the coating after 13 days exposure to Skydrol. There was no apparent blistering or other signs of coating deterioration.

EXAMPLE 15
Rain Erosion Test—Naval Air Development Center

"Unclassified summary of test results from classified report containing testing results on the present invention."

Date: Jun. 15, 1989

"The Naval Air Development Center conducted test in Code 5021 on unprimed aluminum disks protected with the present invention to standard rain-field conditions specified in Mil-R-7705B at its Rain Erosion Test Facility. The samples survived ten minutes exposure to the simulated rain-field at which time small pits had developed exposing approximately 20% of the aluminum surface. Although raid correlated with normal fleet maintenance schedules instead of depot schedules. In considering the difficulty involved when bonding to aluminum substrate outside the facet that no primer nor etching process was employed, the present invention is superior over all paint systems currently used by the fleet in respect to adhesion and erosion resistance. Besides the qualities, the present invention can withstand maximum temperatures created during "dash" conditions of 750° F. (not to exceed fifteen minutes) without degradation of physical properties. In the past, other epoxies had been much lower in dielectric, loss and VOC than their polyurethane counterparts. Code 5021 has conducted preliminary test on the present invention and determined dielectric constant and loss tangent to be 4.51 and 0.061 respectively which is better than polyurethane products currently used. The Material Safety Data Sheet for the present invention (required by the Federal Government) and gives a very low VOC value of 1.89 lb/gal and no apparent toxicity threshold."

EXAMPLE 16
Coating Stripping Feasibility Test (for Aircraft)

a. Procedure: Abrasive blast with PM (plastic media) to determine if the present invention can be removed from F-4 aircraft and if possible at what rate of removal as compared to existing systems.

b. Prepared by: United States Air Force
Hill AFB, Utah
Maintenance Division c. Date: Oct. 16, 1987 d. Test Panels: Six (6) steel panels coated with the present invention to a thickness of 8 mils e. Results: Stripping is feasible. Rate of coating removal was 0.7 square feet per minute, which can be compared to the present average removal rate of 2.6 square feet per minute on an F-4 aircraft. The paint most commonly found on F-4 is gun ship quality polyurethane (Mil-83286). In summary, even though the paint on the panels was more difficult to strip than polyurethane, it can be stripped with relative ease using the PMB stripping pioneered at Hill Air Force Base.

The above description is not intended to limit the scope of the invention to that described, since different additives, catalysts and curing processes may be used as experimentation would lead a person of ordinary skill in the art to practice.

What is claimed is:

1. A high performance surface coating comprising:
   at least one resin,
   inert particles loaded into said resin to form a mixture of resin and inert particles,
   a catalyst, wherein said mixture and said catalyst combine to form a base composition; and
   at least one additive added to said base composition to form a final coating composition comprising desired performance characteristics;
   wherein said performance characteristics comprise adhesion strength of at least approximately 2,000 psi.

2. The coating of claim 1, wherein said at least one resin comprises epoxy.

3. The coating of claim 1, wherein said at least one resin comprises:
   novolac resin, dissolved in 15% MEK by weight of novolac, in the range of from 3.5% to 10% by weight of said base composition,
   polyglycol di-epoxide resin in the range of from 0.7% to 2.7% by weight of said base composition, and
   silicon dioxide in the range of from 4% to 20% based on the weight of the base composition.

4. The coating of claim 1, wherein said at least one additive comprises a selected solvent to dilute said base composition forming a final coating composition for uniform coverage of said surface.

5. The coating of claim 2, wherein said at least one additive comprises a selected solvent to dilute said base composition forming a final coating composition for uniform coverage of said surface.

6. The coating of claim 3, wherein said at least one additive comprises a selected solvent to dilute said base composition forming a final coating composition for uniform coverage of said surface.

7. The coating of claim 4, wherein said selected solvent comprises isopropanol.

8. The coating of claim 4, wherein said selected solvent comprises methyl-ethyl-ketone.

9. The coating of claim 4, wherein said selected solvent comprises isopropanol and methyl-ethyl-ketone.

10. The coating of claim 1, wherein said catalyst comprises diethylene triamine.

11. The coating of claim 2, wherein said catalyst comprises diethylene triamine.

12. The coating of claim 3, wherein said catalyst comprises diethylene triamine.

13. The coating of claim 4, wherein said catalyst comprises diethylene triamine.

14. The coating of claim 1, wherein said catalyst comprises cyclocaliphatic amine.

15. The coating of claim 2, wherein said catalyst comprises cyclocaliphatic amine.

16. The coating of claim 3, wherein said catalyst comprises cyclocaliphatic amine.

17. The coating of claim 4, wherein said catalyst comprises cyclocaliphatic amine.

18. The coating of claim 1, wherein said inert particles comprise ceramic.

19. The coating of claim 2, wherein said inert particles comprise ceramic.

20. The coating of claim 3, wherein said inert particles comprise ceramic.

21. The coating of claim 4, wherein said inert particles comprise ceramic.

22. The coating of claim 1, wherein said inert particles comprise at least 60% of the weight of said mixture.

23. The coating of claim 2, wherein said inert particles comprise at least 60% of the weight of said mixture.

24. The coating of claim 3, wherein said inert particles comprise at least 65% of the weight of said mixture.

25. The coating of claim 4, wherein said inert particles comprise at least 60% of the weight of said mixture.

26. The coating of claim 1, wherein said inert particles comprise in the range of approximately 80% to approximately 90% of the weight of said mixture.

27. The coating of claim 2, wherein said inert particles comprise in the range of approximately 80% to approximately 90% of the weight of said mixture.

28. The coating of claim 3, wherein said inert particles comprise in the range of approximately 80% to approximately 90% of the weight of said mixture.

29. The coating of claim 4, wherein said inert particles comprise in the range of approximately 80% to approximately 90% of the weight of said mixture.

30. A high performance surface coating, said coating comprising:
   a resin comprising epoxy;
   inert particles comprising ceramic loaded into said resin to form a mixture of resin and inert particles, wherein said inerts comprise at least 65% of the weight of said mixture;
   a catalyst comprising diethylene triamine combined with said mixture to form a base composition; and
   an additive comprising isopropanol as a selected solvent to dilute said base composition to form a final coating composition having desired performance characteristics, and wherein said performance characteristics comprise adhesion strength of at least approximately 2,000 psi.

31. The coating of claim 30, wherein said inert particles comprise approximately 90% of the weight of said mixture.

32. A method of applying a high performance surface coating to a surface, said coating comprising: at least one resin; inert particles loaded into said resin to form a mixture of resin and inert particles; a catalyst, wherein said mixture and said catalyst combine to form a base composition; and at least one additive added to said base composition to form a final coating composition having desired performance characteristics, and wherein said performance characteristics comprise adhesion strength of at least approximately 2,000 psi, the method comprising:
   preparing said surface to achieve an appropriate anchor profile,
   re-suspending all said inert particles in said final coating composition,
   applying said final coating composition to said surface, and
   curing said coating to achieve a desired finish.

33. The method of claim 32, wherein said inert particles comprise ceramic.

34. The method of claim 32, wherein said desired finish comprises a glossy finish.

35. The method of claim 32, wherein said desired finish comprises a mat finish.

36. A surface coated by the method of claim 32.

37. A method of manufacturing a high performance surface coating, the method comprising:
   providing at least one resin;
   providing an amount of inert particles;
   loading said inert particles into said resin to form a mixture of resin and inert particles;
   providing a catalyst to harden said resin;
   adding said catalyst to said mixture, wherein said mixture and said catalyst combine to form a base composition;
   providing at least one additive; and
   adding said at least one additive to said base composition to form a final coating composition having desired performance characteristics of said coating, and wherein said performance characteristics comprise adhesion strength of at least approximately 2,000 psi.

38. The method of claim 37, wherein said inert particles comprise at least 60% of the weight of said mixture.

39. The method of claim 37, wherein said inert particles comprise in the range of approximately 80% to approximately 90% of the weight of said mixture.

40. A surface coated by a coating manufactured according to the method of claim 37.

41. A method of manufacturing a high performance surface coating, the method comprising:
   providing at least one resin;
   providing an amount of inert particles;
   loading said inert particles into said resin to form a mixture of resin and inert particles;
   providing a catalyst to harden said resin;

adding said catalyst to said mixture, wherein said mixture and said catalyst combine to form a base composition; and providing at least one additive;

adding at least one additive to said base composition;

adding novolac resin, dissolved in 15% MEK by weight of novolac, added in the range of from 3.5% to 10% by weight of said base composition, adding polyglycol di-epoxide resin in the range of from 0.7% to 2.7% by weight of said base composition, and adding silicon dioxide in the range of from 4% to 20% based on the weight of the base composition to form a final coating composition having desired performance characteristics of said coating, and wherein said performance characteristics comprise adhesion strength of at least approximately 2,000 psi.

42. A surface coated by a coating manufactured according to the method of claim 41.

* * * * *